(12) United States Patent
Boushley et al.

(10) Patent No.: US 10,912,132 B2
(45) Date of Patent: Feb. 2, 2021

(54) SYSTEMS AND METHODS FOR DYNAMIC PAIRING OF ELECTRONIC DEVICES

(71) Applicant: Axon Enterprise, Inc., Scottsdale, AZ (US)

(72) Inventors: C. Aaron Boushley, Issaquah, WA (US); Joseph C. Dimino, Seattle, WA (US)

(73) Assignee: Axon Enterprise, Inc., Scottsdale, AZ (US)

( * ) Notice: Subject to any disclaimer, the term of this patent is extended or adjusted under 35 U.S.C. 154(b) by 47 days.

(21) Appl. No.: 16/023,179

(22) Filed: Jun. 29, 2018

(65) Prior Publication Data

US 2018/0368198 A1    Dec. 20, 2018

Related U.S. Application Data

(60) Provisional application No. 62/492,371, filed on May 1, 2017.

(51) Int. Cl.
| | |
|---|---|
| *H04W 76/14* | (2018.01) |
| *H04W 4/02* | (2018.01) |
| *H04L 29/08* | (2006.01) |
| *H04N 1/00* | (2006.01) |
| *H04N 7/18* | (2006.01) |
| *H04N 5/77* | (2006.01) |

(52) U.S. Cl.
CPC ............. *H04W 76/14* (2018.02); *H04L 67/04* (2013.01); *H04L 67/06* (2013.01); *H04L 67/10* (2013.01); *H04N 1/00209* (2013.01); *H04N 1/00244* (2013.01); *H04N 7/185* (2013.01); *H04W 4/023* (2013.01); *H04N 5/77* (2013.01); *H04N 2201/0084* (2013.01)

(58) Field of Classification Search
CPC ..... H04W 76/14; H04W 4/023; H04W 84/18; H04L 67/04; H04L 67/10; H04L 67/06; H04N 7/185; H04N 1/00209; H04N 1/00244; H04N 5/77; H04N 2201/0084
See application file for complete search history.

(56) References Cited

U.S. PATENT DOCUMENTS

| | | | |
|---|---|---|---|
| 2013/0047178 A1* | 2/2013 | Moon ................ | H04N 21/4753 725/25 |
| 2013/0189925 A1* | 7/2013 | Staskawicz ............. | H04B 7/24 455/41.1 |
| 2014/0073262 A1* | 3/2014 | Gutierrez ............... | G08B 13/22 455/67.11 |
| 2016/0150350 A1* | 5/2016 | Ingale ..................... | H04W 4/70 370/255 |
| 2018/0260800 A1* | 9/2018 | Caution ............... | G06Q 20/208 |

* cited by examiner

*Primary Examiner* — Yogesh K Aggarwal
(74) *Attorney, Agent, or Firm* — Letham Law Firm LLC

(57) ABSTRACT

Police officers and others carry multiple electronic devices with the ability to communicate between each other and with remote devices. Unintentional communications may occur between the devices carried by other police officers, for example, which may cause a device carried by one officer to be controlled by a device carried by a different officer. A method of dynamic pairing between electronic devices, based on the time and proximity of the devices, reduces the possibility for unintentional communications.

20 Claims, 6 Drawing Sheets

SYSTEMS AND METHODS FOR DYNAMIC PAIRING OF ELECTRONIC DEVICES

FIELD OF THE INVENTION

Embodiments of the present invention relate to a creating automatic pairings between electronic devices.

BRIEF DESCRIPTION OF THE DRAWING

Embodiments of the present invention will be described with reference to the drawing, wherein like designations denote like elements, and.

DETAILED DESCRIPTION OF THE PREFERRED EMBODIMENTS

It is not uncommon for people to carry multiple electronic devices that can communicate between each other wirelessly. Law enforcement officers, for example, may carry several wirelessly connected electronic devices such as cameras, sensor equipped holsters, weapons, microphones, etc. The devices may also wirelessly communicate with electronic devices in police cars as well as between each other. The devices may exchange information wirelessly with remote data centers. The wireless connectivity provides a pathway for the exchange of information and instructions. However, the proximity of officers may enable unintentional wireless communication with electronic devices carried by nearby officers. Similarly, the proximity of devices in patrol cars, or within a police station, for example, may enable unintended communication. A system and method for dynamic pairing of electronic devices, as described herein, may reduce the likelihood of unintentional communication.

A system for dynamic pairing of electronic devices may eliminate manual intervention by a user. However, devices such as smart phones may still require a user's input to create a pairing. Dynamic pairing may permit the prioritization of paired devices. For example, in a system with an electronic device paired with multiple devices, the receipt of instructions from the multiple devices may be dependent on the device's relative priority.

Figure 1:
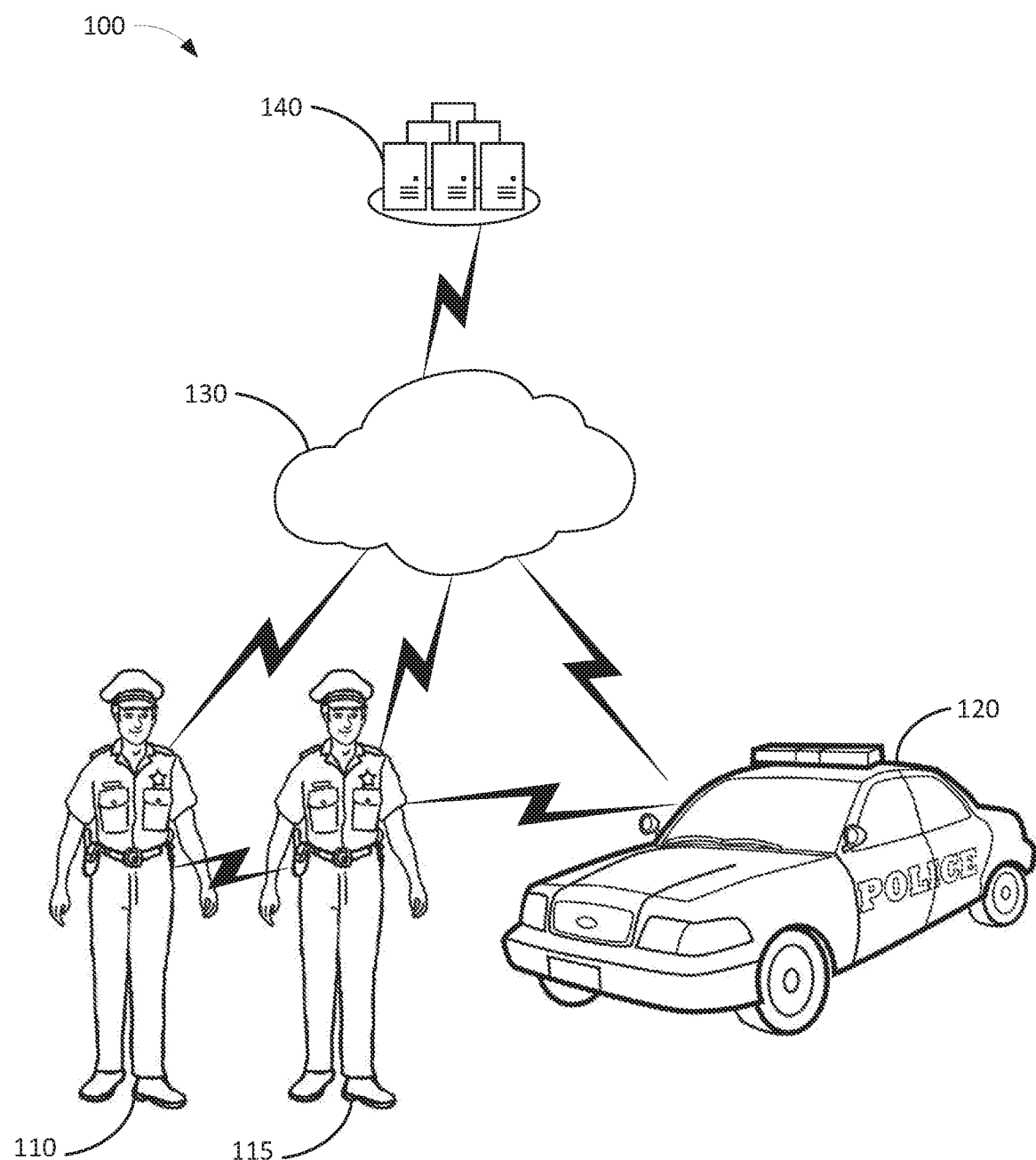
FIG. 1 is a diagram of a system that creates an environment (e.g., ecosystem) for electronic devices to cooperate according to various aspects of the present disclosure.
Figure 2:
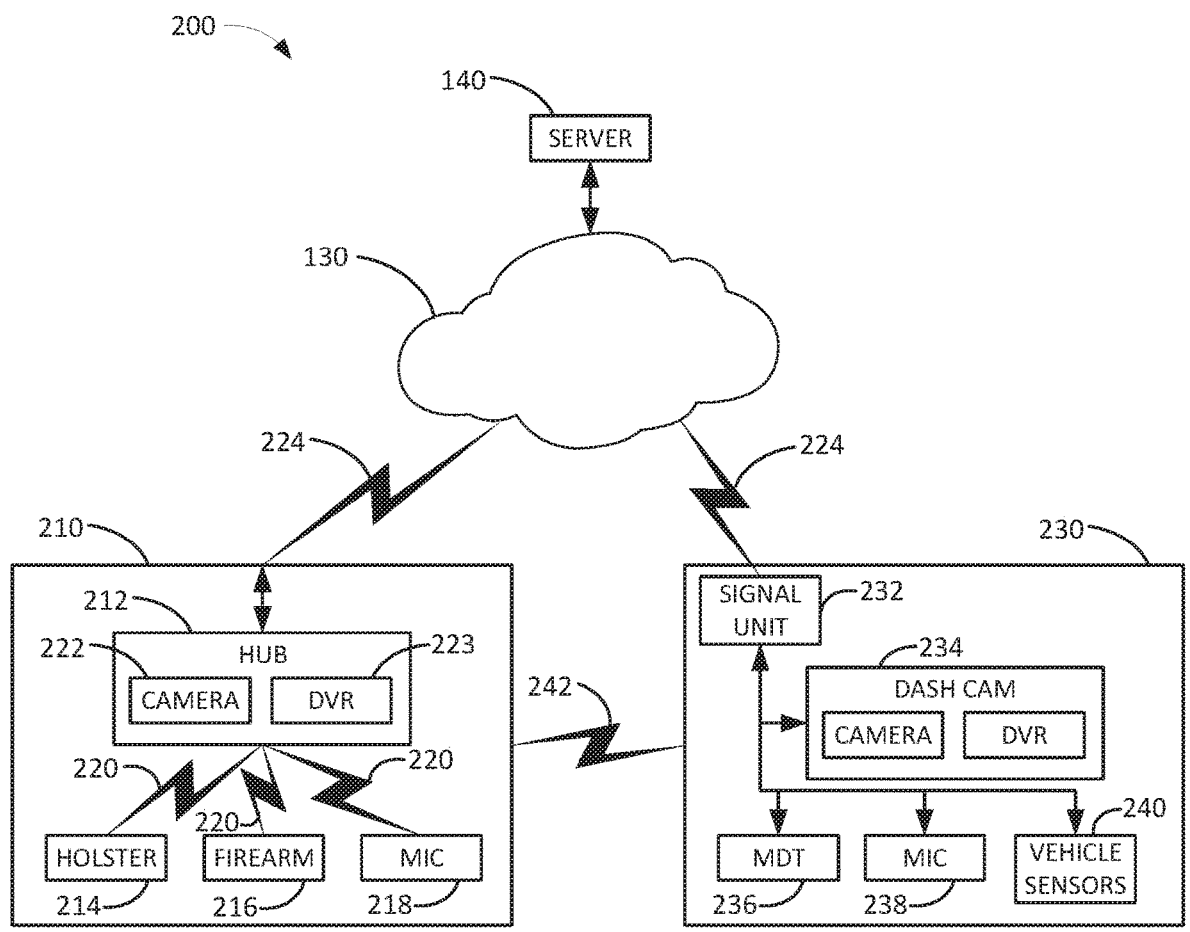
FIG. 2 is a functional block diagram of an implementation of the environment of FIG. 1.

An example of a system illustrating the interconnections between devices is shown in FIG. 1. System 100 may include users 110 and 115, vehicle 120, computer network 130, and server 140. A user may carry (e.g., wear, worn, attached to, or carried on, a user's body) electronic devices (e.g., smart phone, cellular phone, camera, digital video recorder ("DVR"), microphone, biometric or health monitor). The electronic devices carried by a user may wirelessly communicate (e.g., transmits and/or receive information) between the devices on each user or between the devices on another user nearby (e.g., close, separated by a short distance, proximal).

A user may be a police officer (e.g., law enforcement official, detective, sheriff, deputy). A user may be a member of the armed forces (e.g., member of the military, soldier, warfighter, military police, national guardsman). A user may be any person, or a mix of people (e.g., police officers, military personnel, civilian), carrying electronic devices with the ability to communicate wirelessly between the devices.

User 110 or 115 may communicate with server 140 through network 130. A network provides for the transmission and/or reception of information (e.g., data) via wireless and/or wireless communication links. A network interface enables a system or an electronic device, as discussed below, to communicate with other devices and/or systems over a network. The functions of a network interface may be performed by circuits, logic embedded in hardware, software instructions executable by a processor, or any combination thereof. The functions performed by a network interface enable a computing device to communicate with another device. The functions performed by a network interface, whether using hardware or software executed by a processor, may be referred to as services. A device may request the services of a communication interface to communicate with an electronic device. A network may include one or more network technologies (e.g., internet, local area network ("LAN"), wide area network ("WAN"), metropolitan area network ("MAN")).

A server, as used herein, includes any conventional hardware and software that implements a network node that communicates via a LAN and/or a WAN with electronic devices. A server may include capability to forward messages between networks. In an implementation, the server includes conventional computer systems of a data center for communicating with a relatively large number of electronic devices (e.g., 20 to 20,000).

Vehicle 120 may communicate with user 110 and/or user 115. Vehicle 120 may communicate with server 140 through network 130. A vehicle may include electronic devices (e.g., mobile data terminal ("MDT"), camera, computer, radio, microphone, sensors, navigation system, weapons) that can communicate directly with electronic devices carried by a user. A vehicle's electronic devices may communicate with a user's electronic devices through an access point (e.g., signal unit, hub, data concentrator).

A vehicle may include any machine for transporting people (e.g., automobile, car, bus, truck, van). A vehicle may include machines for providing transportation for specific purposes (e.g., police car, squad car, cruiser, mobile patrol, armored vehicle). A vehicle may be controlled autonomously (e.g., without a driver). A vehicle may be controlled remotely (e.g., drone, unmanned aerial system).

In an implementation, system 200 may include user 210, vehicle 230, network 130, and server 140. User 210 may carry hub 212 and accessories such as holster 214, firearm 216, and microphone 218. Vehicle 230 may include signal unit 232, dash cam 234, MDT 236, microphone 238, and vehicle sensors 240. User 210 and vehicle 230 may communicate with server 140 through network 130 via communication link 224.

A holster is a holder (e.g., case, sheath) for a firearm (e.g., pistol, gun, weapon, conducted electrical weapon ("CEW"), stun gun). A holster may include a processing circuit and a sensor to detect the status (e.g., presence, removal, insertion) of a firearm.

A processing circuit includes any circuitry and/or electrical/electronic subsystem for performing a function. A processing circuit may include circuitry that performs (e.g., executes) a stored program. A processing circuit may include a digital signal processor, a microcontroller, a microprocessor, an application specific integrated circuit, a programmable logic device, logic circuitry, state machines, MEMS devices, signal conditioning circuitry, communication circuitry, a conventional computer, a conventional radio, a network appliance, data busses, address busses, and/or a combination thereof in any quantity suitable for performing a function and/or executing one or more stored programs.

A processing circuit may further include conventional passive electronic devices (e.g., resistors, capacitors, inductors) and/or active electronic devices (op amps, comparators, analog-to-digital converters, digital-to-analog converters, programmable logic, transistors). A processing circuit may include conventional data buses, output ports, input ports, timers, memory, and arithmetic units.

A processing circuit may provide and/or receive electrical signals whether digital and/or analog in form. A processing circuit may provide and/or receive digital information via a conventional bus using any conventional protocol. A processing circuit may receive information, manipulate the received information, and provide the manipulated information. A processing circuit may store information and retrieve stored information. Information received, stored, and/or manipulated by the processing circuit may be used to perform a function and/or to perform a stored program.

A processing circuit may have a low power state in which only a portion of its circuits operate or it performs only certain function. A processing circuit may be switched (e.g., awoken) from a low power state to a higher power state in which more or all of its circuits operate or it performs additional certain functions or all of its functions.

A processing circuit may control the operation and/or function of other circuits and/or components of a system. A processing circuit may receive status information regarding the operation of other components, perform calculations with respect to the status information, and provide commands (e.g., instructions) to one or more other components for the component to start operation, continue operation, alter operation, suspend operation, or cease operation. Commands and/or status may be communicated between a processing circuit and other circuits and/or components via any type of bus including any type of conventional data/address bus.

A holster may include a communication circuit for transmitting a status. The communication circuit may receive information for controlling or configuring the holster.

A communication circuit transmits and/or receives information (e.g., data). A communication circuit may transmit and/or receive (e.g., communicate) information via a wireless and/or wireless communication link. A communication circuit may communicate using wireless (e.g., radio, light, sound, vibrations) and/or wired (e.g., electrical, optical) mediums. A communication circuit may communicate using any wireless (e.g., Bluetooth, Zigbee, Wireless Access Protocol ("WAP"), WiFi, Near Field Communication ("NFC"), Infrared Data Association ("IrDA"), Long Term Evolution ("LTE"), Bluetooth Low Energy ("BLE"), EDGE, Evolution-Data Optimized ("EV-DO"), BodyLAN, ANT+) and/or wired (e.g., USB, RS-232, Firewire, Ethernet) communication protocols.

A communication circuit may receive information from a processing circuit for transmission. A communication circuit may provide received information to a processing circuit.

A communication circuit in one device (e.g., hub) may communicate with a communication circuit in another device (e.g., holster). Communications between two devices may permit the two devices to cooperate in performing a function of either device.

Hub 212 may include camera 222 and/or DVR 223. Hub 212 may include a processing circuit as described above. Hub 212 may communicate with holster 214, firearm 216, and/or microphone 218 via communication links 220. Hub 212 may communicate with server 140 through network 130 via communication link 224.

In an implementation, camera 222 may perform the functions of a hub. A camera may perform the functions of a DVR. A camera may record still image. A camera may record audio and/or visual data. A combination of still and video images may be recorded by a camera. A camera may include a processing circuit and communication circuit as described above.

The electronic devices carried by user 210 may communicate with other devices carried by other users via communication link 242. Vehicle 230 may communicate with user 210 via communication link 242.

MDT 236, microphone 238, vehicle sensors 240, dash cam 234 and signal unit 232 may communicate between each other over a wired (e.g., bus) or wireless connection. In an implementation, signal unit 232 may perform the functions of an access point for vehicle 230. The electronic devices of vehicle 230 may communicate with network 130 through signal unit 232 and communications link 224. Signal unit 232 may serve as the access point for communications with the devices carried by user 210. In another implementation, the devices of vehicle 230 may communicate directly with the devices carried by user 210.

To prevent unintentional (e.g., unwanted, accidental, inadvertent, unexpected, unforeseen, unintended) communications between electronic devices carried by a user, between users, or between a user and a vehicle, pairing is needed. Pairing, as used herein, is the establishment of a secure connection or association between two electronic devices. Once paired, the association remains established until either device terminates the pairing. Unintentional communications are avoided by permitting only paired electronic devices to transmit and/or receive information for performing a function between each device.

Figure 3:
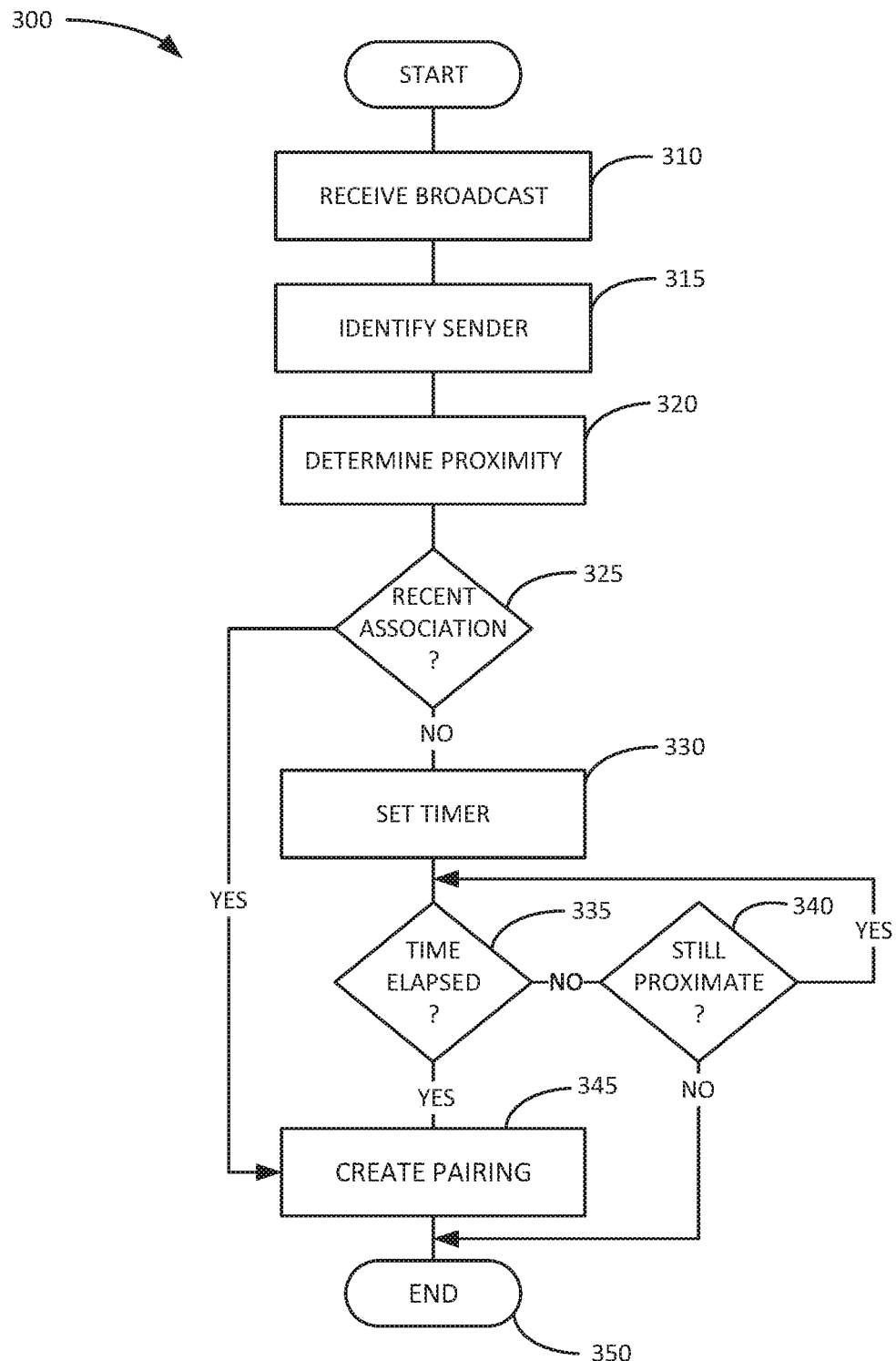
FIG. 3 is a flow chart of a method for establishing a pairing between two electronic devices in an implementation of the system of FIGS. 1 and 2.

Pairing method 300, shown in FIG. 3, is performed by hub 212 to establish an association with an accessory, such as holster 214, firearm 216, microphone 218, and/or any of the devices of vehicle 230. Method 300 includes receive broadcast 310, identify sender 315, determine proximity 320, recent association 325, set timer 330, time elapsed 335, still proximate 340, create pairing 345, and end 350.

In receive broadcast 310, hub 212 monitors its receiver until an identifying signal is received. Each electronic device of user 210 and/or vehicle 230 may broadcast a signal (e.g., Bluetooth advertisement, beacon) that includes an identifier (e.g., serial number, device identifier). The identifier may include a device type in the transmission. Execution proceeds to identify sender 315.

In identify sender 315, hub 212 determines if the identifier extracted from the broadcast matches an approved device (e.g., holster, firearm, microphone, signal unit). The approved devices may be stored in hub 212. The list of approved devices may be stored on server 140. If the device is on the approved list, execution proceeds to determine proximity 320.

In determine proximity 320, hub 212 determines (e.g., estimates, calculates, computes) a distance to the device transmitting the broadcast identifier. Hub 212 may determine the distance by measuring the received signal strength. The distance may be determined by received coordinates included in the broadcast. Time of arrival of the broadcast may be used to determine the distance by comparison with the time the broadcast was transmitted. Once a distance has been determined, it is compared to a predetermined limit (e.g., two meters). The predetermined limit may be set by user 110 or 115. Server 140 may set the distance limit in hub 212. If within the distance limit execution proceeds to recent association 325.

In recent association 325, hub 212 compares the broadcast device identifier with those of devices that were previously paired. The list of devices previously paired may be stored in memory in hub 212 or on server 140. The list may be cleared (e.g., erased, reset, emptied) when hub 212 is activated (e.g., power applied, turned on, switched on). The list may be cleared when hub 212 is inserted into and/or removed from a docking station. The list may be periodically (e.g., daily, every shift change, weekly) cleared. The list may include a date and/or time when the most recent pairing was disabled.

If a recent (e.g., within one hour, within one day) pairing existed between hub 212 and another device, execution proceeds to create pairing 345. Otherwise, execution proceeds to set timer 330.

In set timer 330, a timer (e.g., counter, clock) is started to measure a duration of time. The timer may be included in the processing circuit of hub 212. Once the timer has started, execution proceeds to time elapsed 335.

In time elapsed 335, the elapsed duration of time is compared with a predetermined value (e.g., fifteen minutes) by hub 212. The predetermined duration of time may be set by a user. Server 140 may configure hub 212 with a predetermined duration of time. Hub 212 may be programmed to determine the duration of time using an algorithm (e.g., artificial intelligence, machine learning). If the duration of time has not elapsed, execution proceeds to still proximate 340. If the duration of time has elapsed, execution proceeds to create pairing 345.

In still proximate 340, hub 212 determines the distance to the device broadcasting the identifier from receive broadcast 310. Hub 212 determines distance as described in determine proximity 320 above. If the distance is within the limit, execution loops to time elapsed 335. If the distance is no longer within the limit, no pairing is created and execution proceeds to end 350.

In create pairing 345, a pairing between hub 212 and the broadcasting device is established. Until the pairing is disabled, hub 212 and the broadcasting device may exchange information between each other to perform one or more functions.

Pairing may be disabled (e.g., discontinued, broken) if the device paired with hub 212 is no longer close to the paired device for a period of time (e.g., fifteen minutes). For example, if user 210 leaves vehicle 230 while hub 212, carried by user 210, is paired with signal unit 232, pairing may be disabled until user 210 returns to the vehicle. In another example, user 210 may place hub 212 into a docking station which may cause pairings to be disabled.

Figure 4:
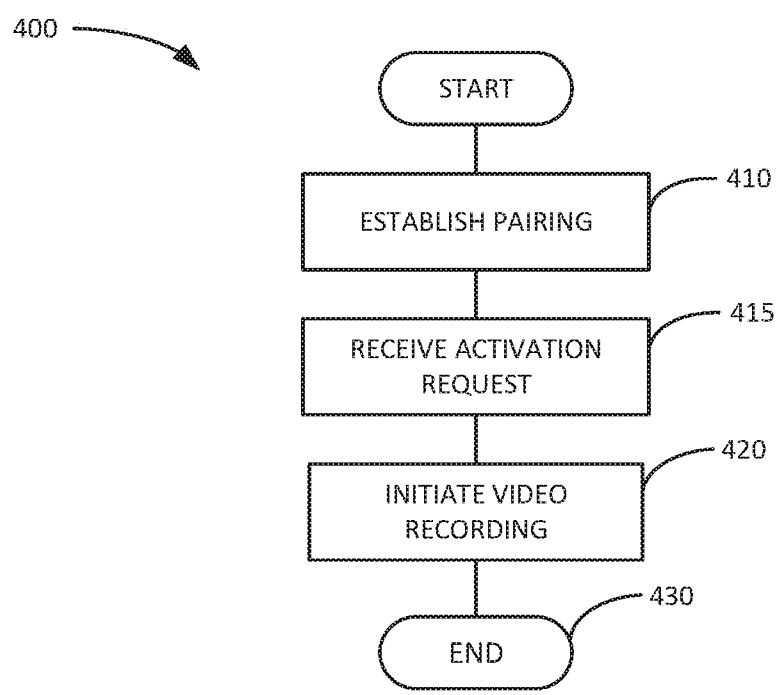
FIG. 4 is a flow chart of a method for activating video recording in a paired device in an implementation of the system of FIG. 2.

Once electronic devices are paired, one device may initiate an activity (e.g., function) in the other device. Activation method 400, shown in FIG. 4, initiates video recording in hub 212. Activation method 400 includes establish pairing 410, receive activation 415, initiate recording 420, and end 430.

In establish pairing 400, pairing is created between two devices, as described in method 300. Once a pairing is created, execution proceeds to receive activation 415.

In receive activation 415, a request (e.g., message, instruction, command) is received by hub 212 to begin recording audio and/or visual data from camera 222. The request may be validated by hub 212. Execution may then proceed to initiate recording 420.

In initiate recording 420, recording may be performed by DVR 223 and or camera 222. The recorded audio and/or video information may include audio and video information from a period of time prior (e.g., loop back) to receiving an activation request (e.g., thirty seconds). For example, removal of a firearm from holster 214, paired with hub 212, may generate an activation request to initiate audio and/or video recording of information captured by camera 222 and/or microphone 218. In another example, firing of weapon 220, paired with hub 212, may trigger recording of audio and/or video data. In yet another example, signal unit 232, paired with hub 212, may activate the DVR in response to vehicle sensors 240. Audio and/or video recording may continue until discontinued (e.g., stopped, suspended, ended) by user 110 or 115. Recording may be discontinued by a command from a paired device. Server 140 may issue instructions to discontinue recording. Execution proceeds to end 430 after recording has been initiated.

Figure 5:
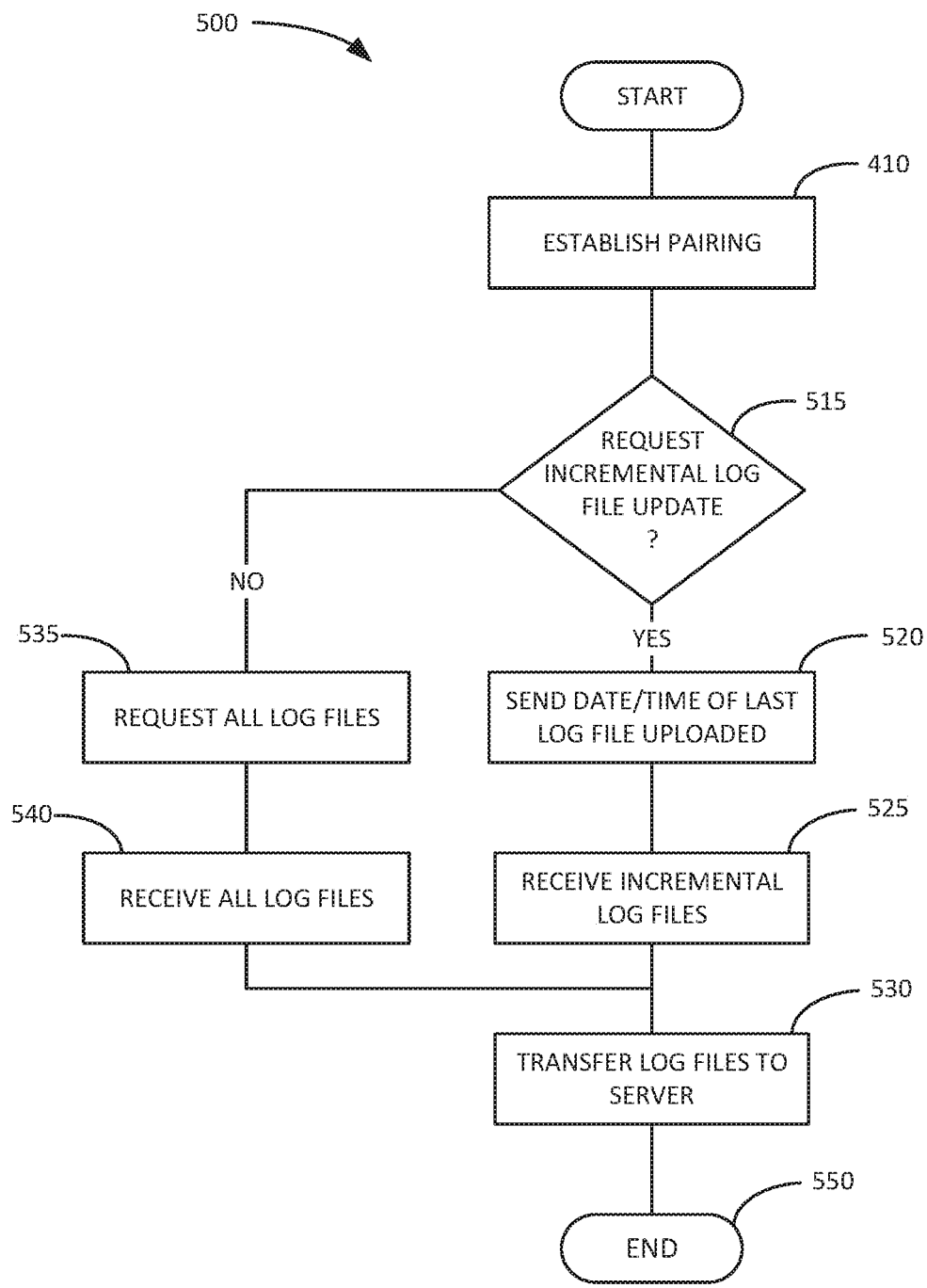
FIG. 5 is a flow chart of a method for transferring information to a server from an electronic device through a paired device in an implementation of the system of FIG. 2.

The electronic devices carried by user 210 or on vehicle 230 may create a log file (e.g., history, record) that includes, for example, status, date and/or time of events, record of use, conditions of use, power levels, etc. The logs may be transferred through a paired device to a server for storage. Upload log files method 500, shown in FIG. 5, executed by hub 212, provides a method for a paired device to receive a request through hub 212 for a log file(s), and to provide the requested log file(s). Method 500 includes establish pairing 410, request log 515, send date/time 520, receive incremental 525, transfer logs 530, request all 535, receive all 540, and end 550.

In establish pairing 410, pairing is created between two devices as described above. Execution then proceeds to request log 515.

In request log 515, hub 212 transmits a log request to the paired device. The log request sent from hub 212 may have originated from a user. Hub 212 may have received the request from server 140. If the request is for all log files in the paired device, execution proceeds to request all 535. If only logs from a specified date and/or time are requested, execution proceeds to send date/time 520. Incremental log requests may include log requests other than requests for all log files. Incremental log requests may be for a subset of log files.

In send date/time 520, a request for log files is sent to the paired device. The request may be for log files with a date/time equal to or after a specified date/time. The request may be for log files not previously sent by the paired device or received by hub 212 or server 140. The request may be for any combination of date/time and event information included in a log file. Upon sending the request to the paired device, execution proceeds to receive incremental 525.

In receive incremental 525, hub 212 receives the log files transmitted by the paired device in response to the request.

Hub 212 may validate (e.g., authenticate, detect and/or correct transmission errors) the received log files. After receipt of the log files, execution proceeds to transfer logs 530.

In request all 535, hub 212 transmits a request for all log files stored in the paired device. A request for all log files may include log files that had previously been transmitted by the paired device. After transmitting the request, execution proceeds to receive all 540.

In receive all 540, hub 212 receives the log files transmitted by the paired device. Hub 212 may validate the received log files. Execution proceeds to transfer logs 530.

In transfer logs 530, hub 212 transmits the logs files received from the paired device to server 130 through communications link 224 and network 130. After confirmation from server 130 that the log files have been received, execution proceeds to end 550.

Figure 6:
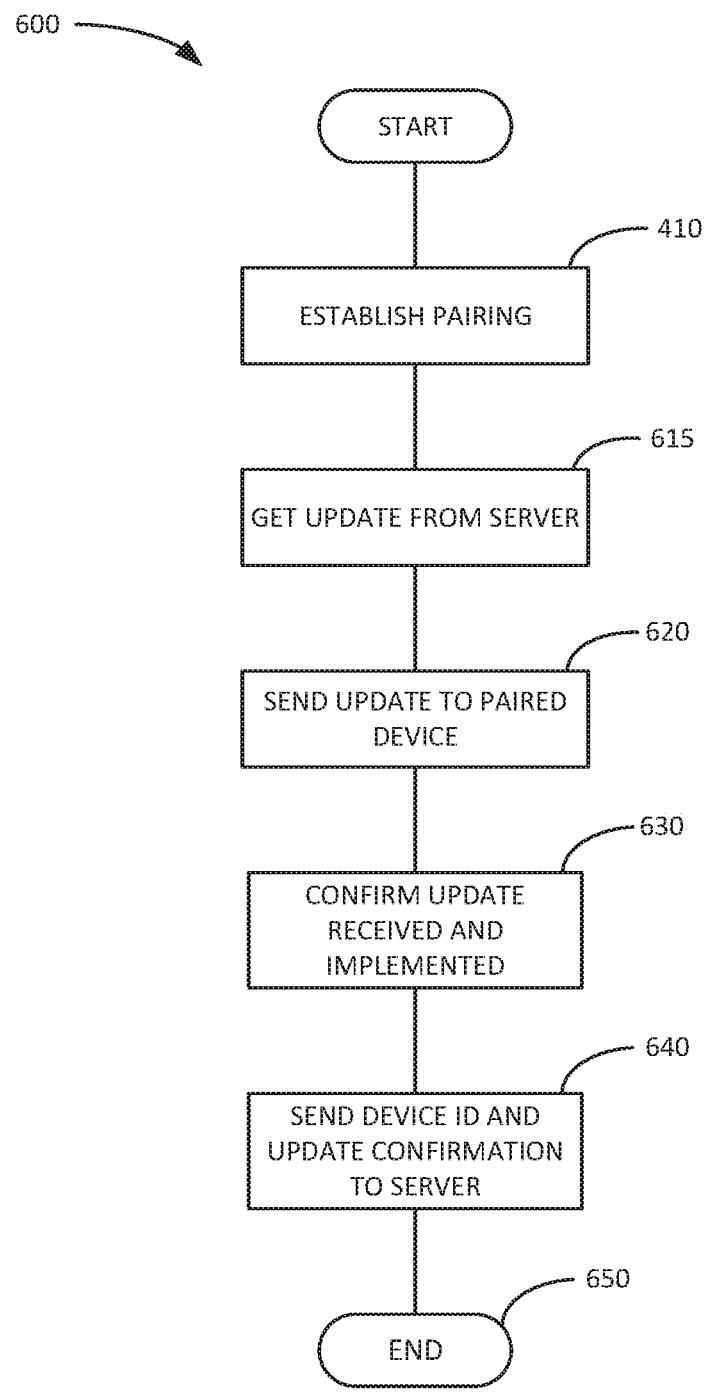
FIG. 6 is a flow chart of a method for transferring information from a server to an electronic device through a paired device in an implementation of the system of FIG. 2.

Log files and audio/video recordings may include date and/or time stamps. To maintain the accuracy of the date and/or time, server 140 may send synchronizing information to hub 212 and/or electronic devices paired to hub 212. Server 140 may also send configuration information (e.g., operational settings, modes of operation, parameter values) to hub 212 and/or devices paired to hub 212. Configuration method 600, shown in FIG. 6, includes establish pairing 410, get update 615, send update 620, confirm update 630, send ID 640, and end 650.

In establish pairing 410, pairing is created between two devices as described above. Execution then proceeds to get update 615.

In get update 615, an update from server 140 is received by hub 212. The update may include a date and/or time synchronization instruction for the paired device. The update may confirm or alter configuration settings for the paired device. The update may be a request for status (e.g., battery status, power levels, configuration settings, identifying information, software/firmware versions, date/time of last update) of the paired device. Execution proceeds to send update 620 after hub 212 has received the update request.

In send update 620, hub 212 transmits the update to the paired device. Execution then proceeds to confirm update 630.

In confirm update 630, hub 212 waits for confirmation from the paired device that the request has been received and is valid. If a confirmation has not been received, hub 212 may retransmit the request. If a confirmation indicates that the request is invalid, or if a confirmation is not received within a duration of time, hub 212 may notify server 140 or user 110 or 120 that a request is invalid or that the request cannot be executed. If confirmation is received from the paired device indicating a correct and valid request, execution proceeds to send ID 640.

In send ID 640, hub 212 receives confirmation from the paired device that the request is valid and has been executed. Hub 212 may transmit the confirmation to server 140. The confirmation may include the paired device identifier and/or serial number. The confirmation may include a status of the paired device. Server 140 may acknowledge receipt of the updated information by transmitting a message to hub 212. Execution proceeds to end 640 after hub 212 has sent confirmation to server 140.

The foregoing description discusses preferred embodiments of the present invention, which may be changed or modified without departing from the scope of the present invention as defined in the claims. Examples listed in parentheses may be used in the alternative or in any practical combination. As used in the specification and claims, the words 'comprising', 'comprises', 'including', 'includes', 'having', and 'has' introduce an open ended statement of component structures and/or functions. In the specification and claims, the words 'a' and 'an' are used as indefinite articles meaning 'one or more'. When a descriptive phrase includes a series of nouns and/or adjectives, each successive word is intended to modify the entire combination of words preceding it. For example, a black dog house is intended to mean a house for a black dog. While for the sake of clarity of description, several specific embodiments of the invention have been described, the scope of the invention is intended to be measured by the claims as set forth below. In the claims, the term "provided" is used to definitively identify an object that not a claimed element of the invention but an object that performs the function of a workpiece that cooperates with the claimed invention. For example, in the claim "an apparatus for aiming a provided barrel, the apparatus comprising: a housing, the barrel positioned in the housing", the barrel is not a claimed element of the apparatus, but an object that cooperates with the "housing" of the "apparatus" by being positioned in the "housing". The invention includes any practical combination of the structures and methods disclosed. While for the sake of clarity of description several specifics embodiments of the invention have been described, the scope of the invention is intended to be measured by the claims as set forth below.

The location indicators "herein", "hereunder", "above", "below", or other word that refer to a location, whether specific or general, in the specification shall be construed to refer to any location in the specification where the location is before or after the location indicator.

What is claimed is:

1. A method for creating a pairing between a hub and an electronic device, the method comprising:
broadcasting, by the electronic device, an identifier;
determining, by the hub, a proximity of the electronic device, wherein the hub comprises a body worn camera;
measuring, by the hub, a duration of time the hub receives the identifier;
establishing, by the hub, the pairing between the hub and the electronic device when the electronic device remains proximal to the hub for the duration of time;
after establishing the pairing between the hub and the electronic device, receiving, by the hub, an activation request from the electronic device; and
initiating, by the hub, video recording upon receipt of the activation request, wherein the video recording comprises video recording of information captured by the body worn camera.

2. The method of claim 1 wherein the electronic device includes a holster.

3. The method of claim 1 wherein the electronic device includes a mobile data terminal of a vehicle.

4. The method of claim 1 further comprising ascertaining whether the identifier is on an approved list.

5. The method of claim 1 wherein broadcasting by the electronic device is performed periodically.

6. The method of claim 1 wherein determining the proximity of the electronic device includes determining, by the hub, a distance to the electronic device.

7. The method of claim 6 wherein determining the distance to the electronic device includes measuring a received signal strength.

8. The method of claim 6 wherein:
broadcasting the identifier includes broadcasting a signal that includes the identifier; and determining the distance to the electronic device includes one of:
determining the distance by received coordinates included in the signal; and
comparing a time of arrival of the signal and a time the signal was transmitted by the electronic device.

9. The method of claim 6 wherein:
determining the proximity of the electronic device includes comparing the distance to a predetermined limit; and
establishing the pairing between the hub and the electronic device includes establishing, by the hub, the pairing between the hub and the electronic device when the distance is within the predetermined limit.

10. The method of claim 1 wherein determining the proximity of the electronic device comprises:
receiving an identifying signal from the electronic device, the identifying signal including the identifier broadcast by the electronic device;
determining a first distance from the hub to the electronic device in accordance with the identifying signal;
determining the first distance is within a distance limit;
after determining the first distance is within the distance limit, determining a second distance from the hub to the electronic device; and
determining the second distance is within the distance limit.

11. The method of claim 10 wherein measuring the duration of time the hub receives the identifier includes determining, by the hub, when the duration of time has elapsed, and wherein the hub determines the second distance from the hub to the electronic device when the duration of time has not elapsed.

12. The method of claim 1 comprising:
receiving, by the hub, a second identifier broadcast by a second electronic device;
determining, by the hub, a distance to the second electronic device is within a predetermined limit;
after determining the distance to the second electronic device is within the predetermined limit, measuring, by the hub, a second duration of time the hub receives the second identifier; and
prior to elapse of the second duration of time, ending by the hub the measuring of the second duration of time when the distance to the second electronic device is no longer within the predetermined limit, wherein no pairing is created between the hub and the second electronic device when the measuring of the second duration of time is ended prior to the elapse of the second duration of time.

13. The method of claim 1 comprising:
after establishing the pairing between the hub and the electronic device, disabling the pairing upon placement of the hub into a docking station.

14. The method of claim 1 comprising:
after establishing the pairing between the hub and the electronic device, determining the electronic device is no longer close to the hub; and
disabling the pairing in accordance with determining the electronic device is no longer close to the hub.

15. A system for dynamic pairing, the system comprising:
an electronic device configured to periodically broadcast an identifier; and
a hub configured to:
receive the identifier periodically broadcast by the electronic device, the identifier received via a communication circuit of the hub;
determine a proximity of the electronic device;
measure a duration of time the hub receives the identifier; and
establish a pairing between the hub and the electronic device if the electronic device remains proximal to the hub for the duration of time.

16. The system of claim 15 wherein:
measuring the duration of time includes comparing, by the hub, the duration of time to a predetermined duration of time;
determining the proximity of the electronic device includes determining, by the hub, a distance to the electronic device; and
repeating the comparing of the duration of time to the predetermined duration of time and the determining of the distance to the electronic device until the duration of time has elapsed compared to the predetermined duration of time.

17. The system of claim 15, wherein the hub comprises a camera and a communication circuit, and wherein the hub is further configured to:
after the pairing between the hub and the electronic device is established, initiate recording of video data by the camera in accordance with a request received from the electronic device via the communication circuit.

18. The system of claim 17, wherein the hub includes a body worn camera and the electronic device comprises an electronic device included in a vehicle.

19. A hub, comprising:
a camera:
a communication circuit; and
a processing circuit configured to:
receive an identifier periodically broadcast by an electronic device, the identifier received via the communication circuit;
determine a proximity of the electronic device;
measure a duration of time the hub receives the identifier;
establish a pairing between the hub and the electronic device if the electronic device remains proximal to the hub for the duration of time; and
after the pairing between the hub and the electronic device is established, initiate recording of video data by the camera in accordance with a request received from the electronic device via the communication circuit.

20. The hub of claim 19 wherein:
measuring the duration of time the hub receives the identifier includes comparing the duration of time to a predetermined duration of time;
determining the proximity of the electronic device includes determining a distance to the electronic device; and
the processing circuit is further configured to repeat the comparing of the duration of time to the predetermined duration of time and the determining of the distance to the electronic device until the duration of time has elapsed compared to the predetermined duration of time.

* * * * *